United States Patent
Huang et al.

(10) Patent No.: US 10,520,964 B1
(45) Date of Patent: Dec. 31, 2019

(54) COMMUNICATION SYSTEM AND VOLTAGE CONVERTER

(71) Applicant: Wistron NeWeb Corp., Hsinchu (TW)

(72) Inventors: Chen-Chia Huang, Hsinchu (TW); Tsung-Hsing Tsai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 16/027,952

(22) Filed: Jul. 5, 2018

(51) Int. Cl.
 G05F 1/59 (2006.01)
 H04N 5/222 (2006.01)

(52) U.S. Cl.
 CPC ............... *G05F 1/59* (2013.01); *H04N 5/222* (2013.01)

(58) Field of Classification Search
 CPC .................................. G05F 1/59; H04N 5/222
 See application file for complete search history.

(56) References Cited

U.S. PATENT DOCUMENTS

| | | | | |
|---|---|---|---|---|
| 7,207,054 B1* | 4/2007 | Richards | ............... | H03F 1/0227 323/282 |
| 7,443,152 B2* | 10/2008 | Utsunomiya | ........... | H02M 3/07 323/284 |
| 8,476,875 B2* | 7/2013 | Reicher | .................... | H02M 1/32 323/222 |
| 2006/0006850 A1* | 1/2006 | Inoue | .................... | H02J 7/0065 323/265 |
| 2013/0057233 A1* | 3/2013 | Hsu | ...................... | H04B 1/1615 323/234 |
| 2015/0155784 A1* | 6/2015 | Ouyang | .............. | H02M 3/1563 323/285 |

\* cited by examiner

*Primary Examiner* — Emily P Pham
(74) *Attorney, Agent, or Firm* — McClure, Qualey & Rodack, LLP

(57) ABSTRACT

A communication system includes an STB (Set-Top Box), an LNB (Low Noise Block Down Converter), and a voltage converter. The voltage converter is coupled between the STB and the LNB. The voltage converter includes a DC (Direct Current) switch element, a voltage regulator, and a controller. The DC switch element is coupled between an input node and an output node. The voltage regulator is coupled between the input node and the output node. The controller detects an input voltage at the input node. If the input voltage is higher than or equal to a threshold voltage, the controller will open the DC switch element. If the input voltage is lower than the threshold voltage, the controller will close the DC switch element.

14 Claims, 4 Drawing Sheets

COMMUNICATION SYSTEM AND VOLTAGE CONVERTER

BACKGROUND OF THE INVENTION

Field of the Invention

The disclosure generally relates to a communication system, and more particularly, it relates to a communication system and a voltage converter with an extremely low voltage drop.

Description of the Related Art

Conventional regulating elements include linear regulator, LDOs (Low Voltage Drop Regulators), and DC-to-DC switching converters, for example. When a conventional regulating element has a relatively low input voltage, the voltage difference (or the voltage drop) between its output voltage and input voltage is usually still greater than 0.1V, which degrades the operation performance and output quality of the regulating element. Accordingly, there is a need to propose a novel solution for solving the problem of the prior art.

BRIEF SUMMARY OF THE INVENTION

In an exemplary embodiment, the disclosure is directed to a communication system including an STB (Set-Top Box), an LNB (Low Noise Block Down Converter), and a voltage converter. The voltage converter is coupled between the STB and the LNB. The voltage converter includes a DC (Direct Current) switch element, a voltage regulator, and a controller. The DC switch element is coupled between an input node and an output node. The voltage regulator is coupled between the input node and the output node. The controller is capable of detecting an input voltage at the input node. When the input voltage is higher than or equal to a threshold voltage, the controller will open the DC switch element. When the input voltage is lower than the threshold voltage, the controller will close the DC switch element.

In some embodiments, the controller includes a first resistor, a second resistor, and a Zener diode. The first resistor has a first terminal coupled to the input node, and a second terminal coupled to a second node. The second resistor has a first terminal coupled to the second node, and a second terminal coupled to a third node. The Zener diode has an anode coupled to a ground voltage, and a cathode coupled to the third node.

In some embodiments, the controller further includes a second transistor and a third resistor. The second transistor has a control terminal coupled to the second node, a first terminal coupled to the input node, and a second terminal coupled to the first node. The third resistor has a first terminal coupled to the first node, and a second terminal coupled to the ground voltage.

In some embodiments, the second transistor is a PNP-type BJT (Bipolar Junction Transistor).

In another exemplary embodiment, the disclosure is directed to a voltage converter coupled between an STB (Set-Top Box) and an LNB (Low Noise Block Down Converter). The voltage converter includes a DC (Direct Current) switch element, a voltage regulator, and a controller. The DC switch element is coupled between an input node and an output node. The voltage regulator is coupled between the input node and the output node. The controller detects an input voltage at the input node. When the input voltage is higher than or equal to a threshold voltage, the controller will open the DC switch element. When the input voltage is lower than the threshold voltage, the controller will close the DC switch element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
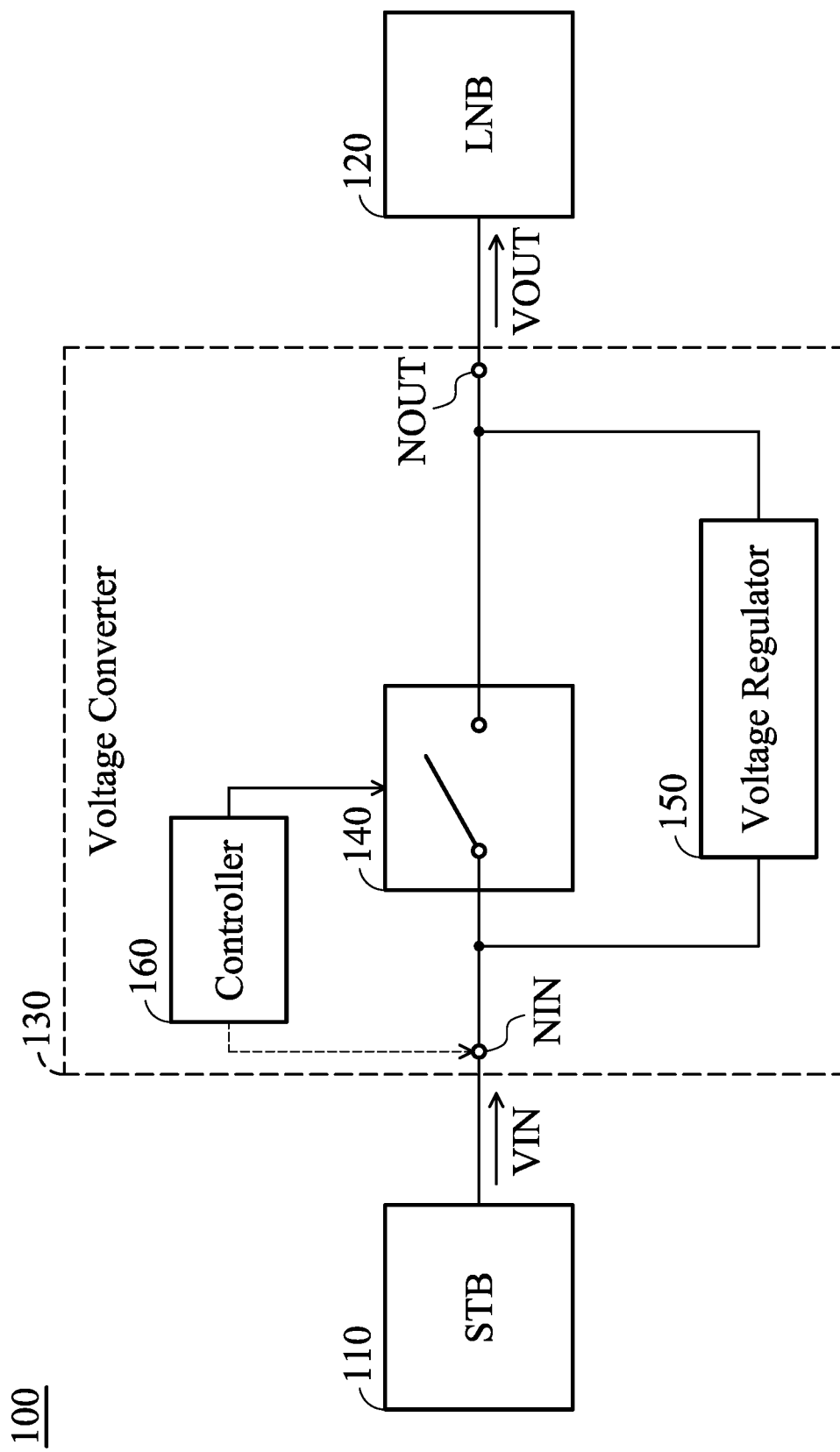
FIG. 1 is a diagram of a communication system according to an embodiment of the invention.

FIG. 1 is a diagram of a communication system 100 according to an embodiment of the invention. As shown in FIG. 1, the communication system 100 includes an STB (Set-Top Box) 110, an LNB (Low Noise Block Down Converter) 120, and a voltage converter 130. The voltage converter 130 is coupled between the STB 110 and the LNB 120. The voltage converter 130 has an input node NIN and an output node NOUT. The input node NIN is adapted to receive an input voltage VIN from the STB 110. The output node NOUT is adapted to output an output voltage VOUT to the LNB 120. Generally, the STB 110 may be considered as a power supply device, the input voltage VIN may be converted into the output voltage VOUT by the voltage converter 130, and the LNB 120 may be supplied by the output voltage VOUT.

The voltage converter 130 includes a DC (Direct Current) switch element 140, a voltage regulator 150, and a controller 160. The DC switch element 140 is coupled between the input node NIN and the output node NOUT, and it operates in a closed state or an open state. The voltage regulator 150 is also coupled between the input node NIN and the output node NOUT, and it is configured to selectively stabilize the voltage level of the output voltage VOUT. The controller 160 may include a voltage detector (not shown), such as a voltmeter. The controller 160 is capable of detecting the input voltage VIN at the input node NIN, and control the operation state of the DC switch element 140 according to the input voltage VIN. When the input voltage VIN is higher than or equal to a threshold voltage VTH, the controller 160 will open the DC switch element 140. Conversely, when the input voltage VIN is lower than the threshold voltage VTH, the controller 160 will close the DC switch element 140.

The operation principles of the voltage converter 130 may be as follows. If the DC switch element 140 is opened, the voltage regulator 150 will convert the input voltage VIN into the output voltage VOUT having a constant level. Conversely, if the DC switch element 140 is closed, the output voltage VOUT will be substantially equal to the input voltage VIN. Because the DC switch element 140 has a very small closed resistance, the voltage difference between the output voltage VOUT and the input voltage VIN is almost negligible. Generally, the DC switch element 140 provides a bypass path between the output node NOUT and the input node NIN. When the input voltage VIN is too low, the output node NOUT can be directly coupled to the input node NIN by the DC switch element 140. Such a design helps to eliminate the non-ideal voltage drop generated by the voltage regulator 150, thereby improving the operation performance and reliability of the voltage converter 130.

In some embodiments, the LNB 120 is further coupled to a dish antenna for receiving a satellite signal. The dish antenna can receive electromagnetic waves in a variety of polarization directions according to the output voltage VOUT having different voltage levels, and therefore the STB 110 can select different channels relative to the satellite signal by changing the input voltage VIN. In some embodiments, the voltage converter 130 and the LNB 120 are both disposed in an ODU (Outdoor Unit), and the STB 110 is coupled through a cable to the ODU. Since the voltage drop of the voltage converter 130 is extremely low, it can reduce the probability of the ODU having an insufficient supply voltage due to the loss of too long cable. In alternative embodiments, the voltage converter 130 is used as an independent element, without being together with the STB 110 and the LNB 120.

The following embodiments will introduce the detailed circuit structure of the voltage converter 130. It should be noted that these figures and descriptions are merely exemplary, rather than limitations of the invention.

Figure 2:
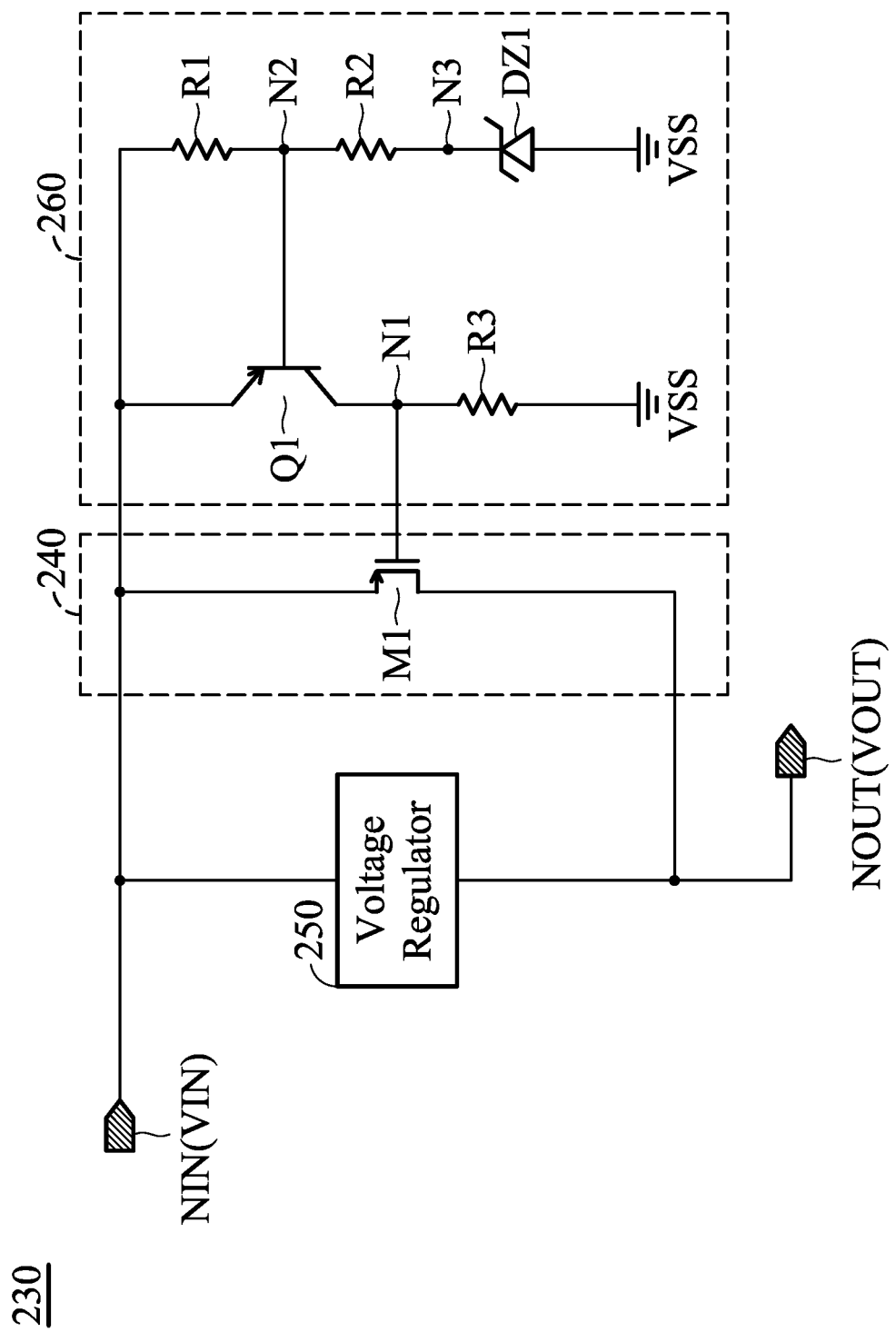
FIG. 2 is a diagram of a voltage converter according to an embodiment of the invention.

FIG. 2 is a diagram of the voltage converter 230 according to an embodiment of the invention. The voltage converter 230 has an input node NIN and an output node NOUT. The input node NIN is adapted to receive an input voltage VIN. The output node NOUT is adapted to output an output voltage VOUT. In the embodiment of FIG. 2, the voltage converter 230 includes a DC switch element 240, a voltage regulator 250, and a controller 260. The voltage regulator 250 is coupled between the input node NIN and the output node NOUT.

The DC switch element 240 includes a first transistor M1. The first transistor M1 has a control terminal coupled to a first node N1, a first terminal coupled to the input node NIN, and a second terminal coupled to the output node NOUT. For example, the first transistor M1 may be a PMOS transistor (P-type Metal Oxide Semiconductor Field Effect Transistor). Specifically, the PMOS transistor has a gate coupled to the first node N1, a source coupled to the input node NIN, and a drain coupled to the output node NOUT.

The controller 260 includes a first resistor R1, a second resistor R2, a third resistor R3, a Zener diode DZ1, and a second transistor Q1. The first resistor R1 has a first terminal coupled to the input node NIN, and a second terminal coupled to a second node N2. The second resistor R2 has a first terminal coupled to the second node N2, and a second terminal coupled to a third node N3. The Zener diode DZ1 has an anode coupled to a ground voltage VSS, and a cathode coupled to the third node N3. The second transistor Q1 has a control terminal coupled to the second node N2, a first terminal coupled to the input node NIN, and a second terminal coupled to the first node N1. For example, the second transistor Q1 may be a PNP-type BJT (Bipolar Junction Transistor). Specifically, the PNP-type BJT has a base coupled to the second node N2, an emitter coupled to the input node NIN, and a collector coupled to the first node N1. The third resistor R3 has a first terminal coupled to the first node N1, and a second terminal coupled to the ground voltage VSS.

Figure 3:
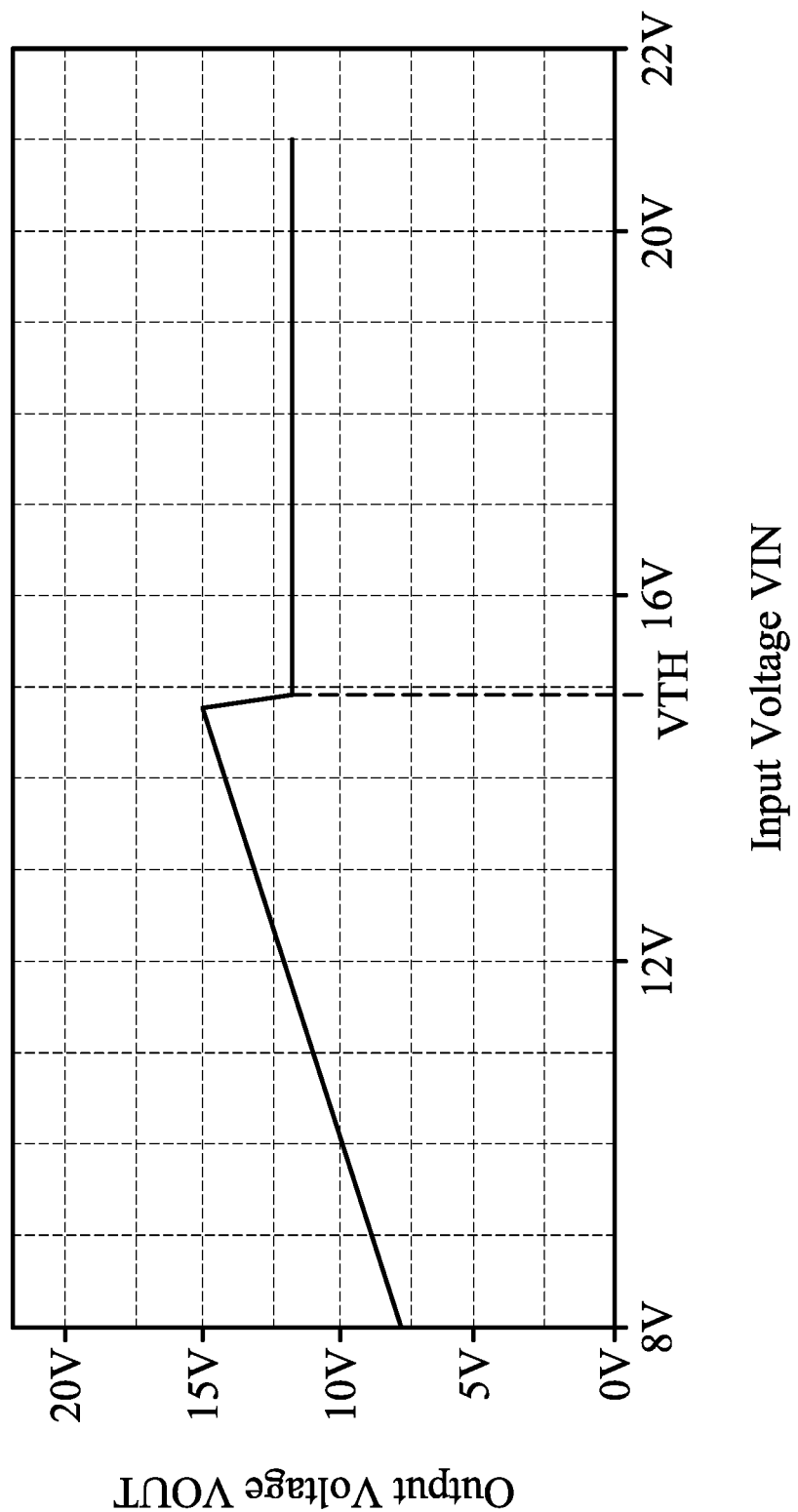
FIG. 3 is a diagram of operation characteristics of a voltage converter according to an embodiment of the invention.

FIG. 3 is a diagram of operation characteristics of the voltage converter 230 according to an embodiment of the invention. The horizontal axis represents the input voltage VIN, and the vertical axis represents the output voltage VOUT. According to the measurement of FIG. 3, when the input voltage VIN is lower than a threshold voltage VTH (e.g., about 15V), the output voltage VOUT is substantially equal to the input voltage VIN, and when the input voltage VIN is higher than or equal to the threshold voltage VTH, the output voltage VOUT is substantially a constant value (e.g., about 12V). Therefore, the design of the voltage converter 230 can effectively offset the non-ideal voltage drop of the output voltage VOUT, especially for the relatively low input voltage VIN.

Please refer to FIG. 2 and FIG. 3 together. The operation principles of the voltage converter 230 may be as follows. When the input voltage VIN is lower than the threshold voltage VTH, the Zener diode DZ1 may not operate in a breakdown region, and the voltage at the second node N2 may be substantially equal to the input voltage VIN. At this time, the second transistor Q1 is turned off, such that the voltage at the first node N1 is substantially equal to the ground voltage VSS. Accordingly, the first transistor M1 is enabled to directly couple the output node NOUT to the input node NIN, and the voltage regulator 250 is disabled due to the bypass path between the output node NOUT and the input node NIN.

Conversely, when the input voltage VIN is equal to or higher than the threshold voltage VTH, the Zener diode DZ1 may operate in the breakdown region, so as to pull down the voltage at the second node N2. At this time, the second transistor Q1 is turned on to pull up the voltage at the first node N1. Accordingly, the first transistor M1 is disabled and the aforementioned bypass path is removed, such that the voltage regulator 250 generates the output voltage VOUT having a constant level according to the input voltage VIN.

It should be noted that the aforementioned threshold voltage VTH is determined according to the breakdown voltage of the Zener diode DZ1 and the resistance ratio of the first resistor R1 to the second resistor R2 (i.e., R1/R2). For example, if the resistance ratio of the first resistor R1 to the second resistor R2 decreases, the threshold voltage VTH may become higher; conversely, if the resistance ratio of the first resistor R1 to the second resistor R2 increases, the threshold voltage VTH may become lower. The designer of circuitry can fine-tune the threshold voltage VTH by changing the resistance ratio of the first resistor R1 to the second resistor R2, so as to meet different use requirements.

Figure 4:
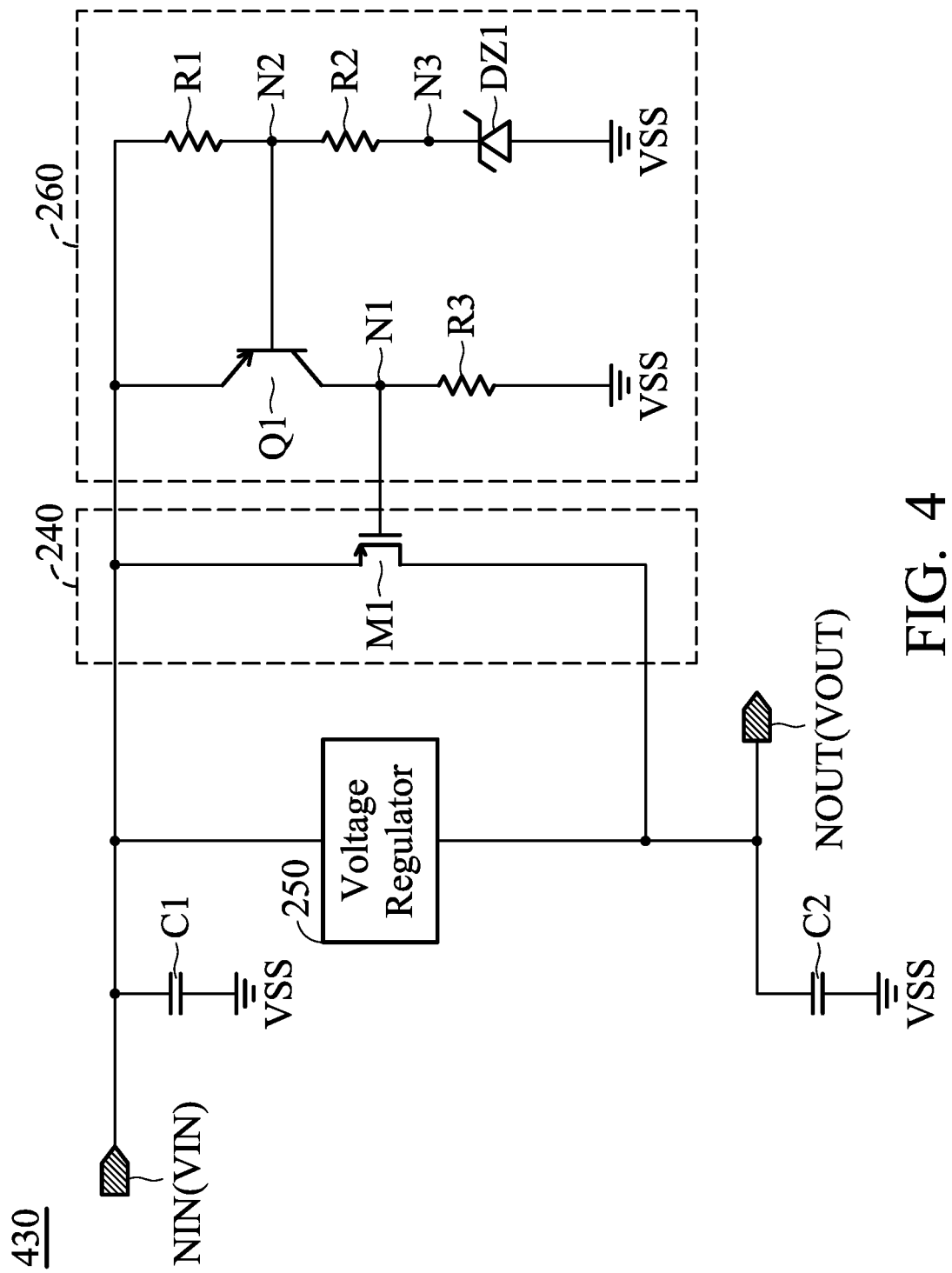
FIG. 4 is a diagram of a voltage converter according to another embodiment of the invention.

FIG. 4 is a diagram of a voltage converter 430 according to another embodiment of the invention. FIG. 4 is similar to FIG. 2. In the embodiment of FIG. 4, the voltage converter 430 further includes a first capacitor C1 and a second capacitor C2. The first capacitor C1 has a first terminal coupled to the input node NIN, and a second terminal coupled to the ground voltage VSS. The second capacitor C2 has a first terminal coupled to the output node NOUT, and a second terminal coupled to the ground voltage VSS. The incorporation of the first capacitor C1 and the second capacitor C2 helps to filter out high-frequency noise of the voltage converter 430, thereby further improving the output quality of the voltage converter 430. Other features of the voltage converter 430 of FIG. 4 are similar to those of the voltage converter 230 of FIG. 2. Therefore, the two embodiments can achieve similar levels of performance.

The invention proposes a novel voltage converter for effectively eliminating the non-ideal voltage drop of regulating elements, and it also improves the operation performance and reliability of the whole system. Accordingly, the invention is suitable for application in a variety of communication systems.

Note that the above voltages, currents, resistances, inductances, capacitances and other element parameters are not limitations of the invention. A designer can adjust these parameters according to different requirements. The communication system and the voltage converter of the invention are not limited to the configurations of FIGS. 1-4. The invention may merely include any one or more features of any one or more embodiments of FIGS. 1-4. In other words, not all of the features displayed in the figures should be implemented in the communication system and the voltage converter of the invention. Although the embodiments of the invention use MOSFET (Metal Oxide Semiconductor Field Effect Transistor) as examples, the invention is not limited thereto, and those skilled in the art may use other types of transistors such as BJT (Bipolar Junction Transistor), JFET (Junction Gate Field Effect Transistor), FinFET (Fin Field Effect Transistor), etc.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system, comprising:
an STB (Set-Top Box);
an LNB (Low Noise Block Down Converter); and
a voltage converter, coupled between the STB and the LNB, wherein the voltage converter comprises:
a DC (Direct Current) switch element, coupled between an input node and an output node;
a voltage regulator, coupled between the input node and the output node; and
a controller, capable of detecting an input voltage at the input node, wherein when the input voltage is higher than or equal to a threshold voltage, the controller opens the DC switch element, and when the input voltage is lower than the threshold voltage, the controller closes the DC switch element;
wherein the input node of the voltage converter is arranged to receive the input voltage from the STB, and the output node of the voltage converter is arranged to output an output voltage to the LNB;
wherein the DC switch element comprises:
a first transistor, wherein the first transistor has a control terminal coupled to a first node, a first terminal coupled to the input node, and a second terminal coupled to the output node;
wherein the controller comprises:
a first resistor, wherein the first resistor has a first terminal coupled to the input node, and a second terminal coupled to a second node;
a second resistor, wherein the second resistor has a first terminal coupled to the second node, and a second terminal coupled to a third node; and
a Zener diode, wherein the Zener diode has an anode coupled to a ground voltage, and a cathode coupled to the third node.

2. The communication system as claimed in claim 1, wherein if the DC switch element is opened, the voltage regulator converts the input voltage into an output voltage having a constant level.

3. The communication system as claimed in claim 1, wherein if the DC switch element is closed, the output voltage is substantially equal to the input voltage.

4. The communication system as claimed in claim 1, wherein the first transistor is a PMOS transistor (P-type Metal Oxide Semiconductor Field Effect Transistor).

5. The communication system as claimed in claim 1, wherein the controller further comprises:
a second transistor, wherein the second transistor has a control terminal coupled to the second node, a first terminal coupled to the input node, and a second terminal coupled to the first node; and
a third resistor, wherein the third resistor has a first terminal coupled to the first node, and a second terminal coupled to the ground voltage.

6. The communication system as claimed in claim 5, wherein the second transistor is a PNP-type BJT (Bipolar Junction Transistor).

7. The communication system as claimed in claim 1, wherein the voltage converter further comprises:
a first capacitor, wherein the first capacitor has a first terminal coupled to the input node, and a second terminal coupled to a ground voltage; and
a second capacitor, wherein the second capacitor has a first terminal coupled to the output node, and a second terminal coupled to the ground voltage.

8. A voltage converter coupled between an STB (Set-Top Box) and an LNB (Low Noise Block Down Converter), comprising:
a DC (Direct Current) switch element, coupled between an input node and an output node;
a voltage regulator, coupled between the input node and the output node; and
a controller, detecting an input voltage at the input node, wherein if the input voltage is higher than or equal to a threshold voltage, the controller opens the DC switch element, and if the input voltage is lower than the threshold voltage, the controller closes the DC switch element;
wherein the input node of the voltage converter is arranged to receive the input voltage from the STB, and the output node of the voltage converter is arranged to output an output voltage to the LNB;

wherein the DC switch element comprises:

a first transistor, wherein the first transistor has a control terminal coupled to a first node, a first terminal coupled to the input node, and a second terminal coupled to the output node;

wherein the controller comprises:

a first resistor, wherein the first resistor has a first terminal coupled to the input node, and a second terminal coupled to a second node;

a second resistor, wherein the second resistor has a first terminal coupled to the second node, and a second terminal coupled to a third node; and a Zener diode, wherein the Zener diode has an anode coupled to a ground voltage, and a cathode coupled to the third node.

9. The voltage converter as claimed in claim 8, wherein if the DC switch element is opened, the voltage regulator converts the input voltage into the output voltage having a constant level.

10. The voltage converter as claimed in claim 8, wherein if the DC switch element is closed, the output voltage is substantially equal to the input voltage.

11. The voltage converter as claimed in claim 8, wherein the first transistor is a PMOS transistor (P-type Metal Oxide Semiconductor Field Effect Transistor).

12. The voltage converter as claimed in claim 8, wherein the controller further comprises:

a second transistor, wherein the second transistor has a control terminal coupled to the second node, a first terminal coupled to the input node, and a second terminal coupled to the first node; and a third resistor, wherein the third resistor has a first terminal coupled to the first node, and a second terminal coupled to the ground voltage.

13. The voltage converter as claimed in claim 12, wherein the second transistor is a PNP-type BJT (Bipolar Junction Transistor).

14. The voltage converter as claimed in claim 8, further comprising:

a first capacitor, wherein the first capacitor has a first terminal coupled to the input node, and a second terminal coupled to a ground voltage; and a second capacitor, wherein the second capacitor has a first terminal coupled to the output node, and a second terminal coupled to the ground voltage.

* * * * *